United States Patent [19]
Junier

[11] Patent Number: 5,979,870
[45] Date of Patent: Nov. 9, 1999

[54] BUTTERFLY VALUE WITH OFFSET STEM

[75] Inventor: Marius Robert Junier, Houston, Tex.

[73] Assignee: Tapco International, Inc., Houston, Tex.

[21] Appl. No.: 09/033,420

[22] Filed: Mar. 2, 1998

[51] Int. Cl.$^6$ ..................................................... F16K 1/22
[52] U.S. Cl. ........................................... 251/305; 137/375
[58] Field of Search ............................. 251/305; 137/375

[56] References Cited

U.S. PATENT DOCUMENTS

| | | | |
|---|---|---|---|
| 3,442,488 | 5/1969 | Adams | 251/305 |
| 3,931,955 | 1/1976 | Jacobs | 251/305 |
| 4,037,819 | 7/1977 | Kindersley | 251/305 X |
| 4,311,166 | 1/1982 | De Feo | 251/305 X |

*Primary Examiner*—John Fox
*Attorney, Agent, or Firm*—James F. Weiler

[57] ABSTRACT

The present invention constitutes an improvement over U.S. Pat. No. 5,269,493, and other butterfly valves controlling the flow of hot gases or other fluids under high pressures or velocities by having the valve stem not centered in which there is either no deflection or the deflection of the butterfly valve and rotation of the valve stem is substantially reduced when in a closed position resulting in no or substantially reduced leakage of the disc in closed position with respect to prior art butterfly valves currently in comparable use.

8 Claims, 4 Drawing Sheets

BUTTERFLY VALUE WITH OFFSET STEM

FIELD OF THE INVENTION

The present invention is directed to butterfly valves suitable for controlling the flow of hot gases or other fluids under high velocities.

1. Background of the Invention

Prior art butterfly valves for controlling high temperature, high velocity flow of fluids typically leak from about 0.75 percent to 2.0 percent because the stem of the butterfly valve and the disc are centered which are deflected by the high velocity flow. Such a butterfly valve is illustrated in U.S. Pat. No. 5,269,493.

The present invention constitutes an improvement over U.S. Pat. No. 5,269,493 in which the valve stem is not centered; and consequently there is no substantial deflection of the butterfly valve and stems when in a closed position; and, accordingly, no or substantially reduced leakage past the disc.

2. Prior Art

The following patents, in addition to U.S. Pat. No. 5,269,493, represent the current state of the art with respect to butterfly valves with an offset stem.

U.S. Pat. No. 2,192,703 discloses a carburetor with an unbalanced butterfly-type choke valve mounted on shaft 7 and located in airhorn 2.

U.S. Pat. No. 2,603,444 discloses a carburetor with an unbalanced disk or butterfly-type choke valve 15 mounted on shaft 17.

U.S. Pat. No. 2,051,881 discloses a carburetor 10 with an airhorn 14 having a choke valve 16 pivotally mounted in the horn by cross shaft 18, which is located slightly above the center line of the air opening to unbalance the valve.

U.S. Pat. No. 1,545,995 discloses a throttle valve mechanism 5 mounted on pin 6 and rotatably mounted in valve casing 7 in fuel inlet passage 8 between carburetor 9 and inlet manifold 10.

U.S. Pat. No. 5,158,265 discloses a butterfly valve wherein shaft 2 is parallel and offset from disk 3 so that the disk is eccentrically mounted on shaft 2 for contacting seat ring 5.

None of the foregoing patents, however, disclose or suggest butterfly valves for use in controlling the flow of hot gases or other fluids under high pressures or velocities which provide a solution as to leakage of centered butterfly valves when their discs are closed.

It would be advantageous to provide butterfly valves which can be used with high temperatures (1000° F.+) and high velocities or pressure (50 psi+) for controlling flow of fluids with no or substantially reduced deflection of their discs and rotation of their valve stems and hence leakage when closed.

SUMMARY OF THE INVENTION

The present invention is directed to such butterfly valves which substantially eliminate or reduce leakage in controlling high pressure transfer of fluids by eliminating or reducing deflection of their discs and rotation of their valve stems.

The butterfly valve of the present invention is an improvement of butterfly valves for controlling high velocity or pressure flow including a body having a flowway therethrough adapted to be connected as part of a flow line, a valve stem rotatably and sealably extending transversely through the body and the flowway, a disc connected to the stem for rotation therewith within the flowway, the body having first and second stop means to engage opposite sides of the disc when closed positioned transverse to flow in the flowway, which improvement comprises positioning the valve stem off center from flow through the flowway thereby providing a longer and a shorter extension of the disc across the flowway and positioning the first stop means to engage the longer extension of the disc on the downstream side of the flow and the second stop means to engage the shorter extension of the disc on the upstream side of the flow when the disc is in the closed position which is effective to reduce deflection of the disc and rotation of the valve stem and thus reduce or prevent leakage flow past the disc.

Accordingly, it is an object of the present invention to provide a butterfly valve for controlling high pressure flow of fluids which substantially eliminates or reduces leakage when the butterfly valve is in the closed position.

It is yet a further object of the present invention to provide such a butterfly valve in which the valve stem is positioned off center from flow through the flowway of the valve body which eliminates or reduces any substantial deflection of the disc and rotation of the valve stem which substantially prevents or eliminates leakage through the butterfly valve when closed.

Other and further objects, features, and advantages are set forth and are inherent in the butterfly valve of the present invention as set forth throughout the specification and claims.

DESCRIPTION OF THE PREFERRED EMBODIMENTS

Figure 1:
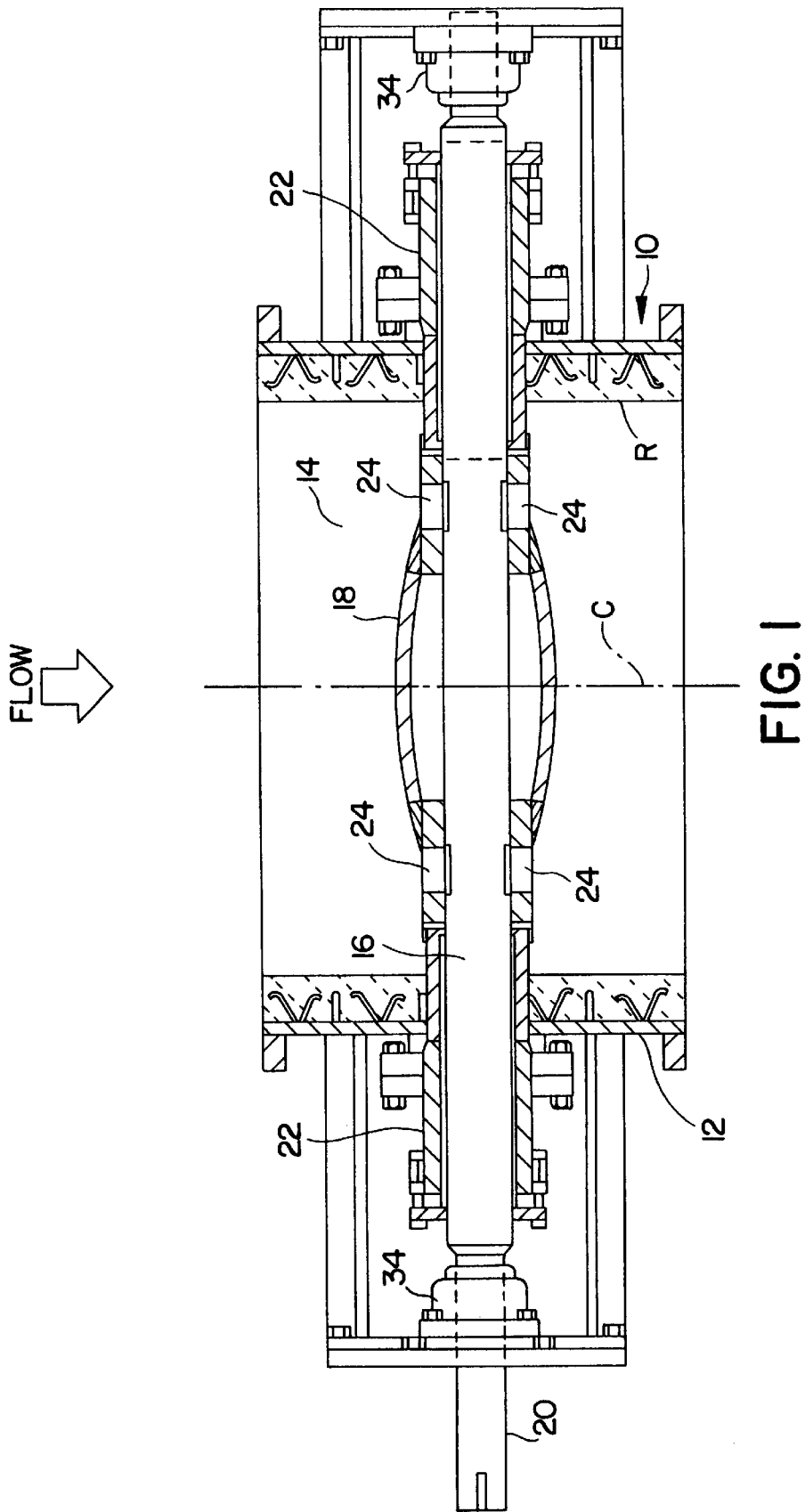
FIG. 1 is an elevational view in section illustrating a butterfly valve according to the invention.

Referring now to the drawings and particularly to FIG. 1, a butterfly valve of the present invention is illustrated and designated by the reference numeral 10 having the body 12 and a flowway 14 therethrough adapted to be connected as part of a flow line, not shown, and has the valve stem 16 rotatably and sealably extending through the body 12 and the flowway 14. A disc 18 is connected to the stem 16 for rotation within the flowway 14. The stem and, thus, the disc are caused to rotate by means connected to the stem extension 20, which means are not shown. As illustrated, stuffing boxes 22 are provided on the body which sealingly and rotatably receive the stem 16 and are of a construction similar to that shown in U.S. Pat. Nos. 5,269,493 and 4,899,899. Accordingly, no further description thereof is deemed necessary or given.

The disc 18 is connected to the stem 16 by any suitable means, such as the keys 24 which enable the assembly of the stem 16 within the disc 18 and permit relative axial movement of the disc 18 with respect to the stem 16 to a limited extent, such as described in U.S. Pat. No. 5,269,493, whereby the disc is free to move limited distances axially of the stem 16. This permits expansion and contraction of the butterfly valve 18 due to differences between ambient and working temperatures.

Figure 2:
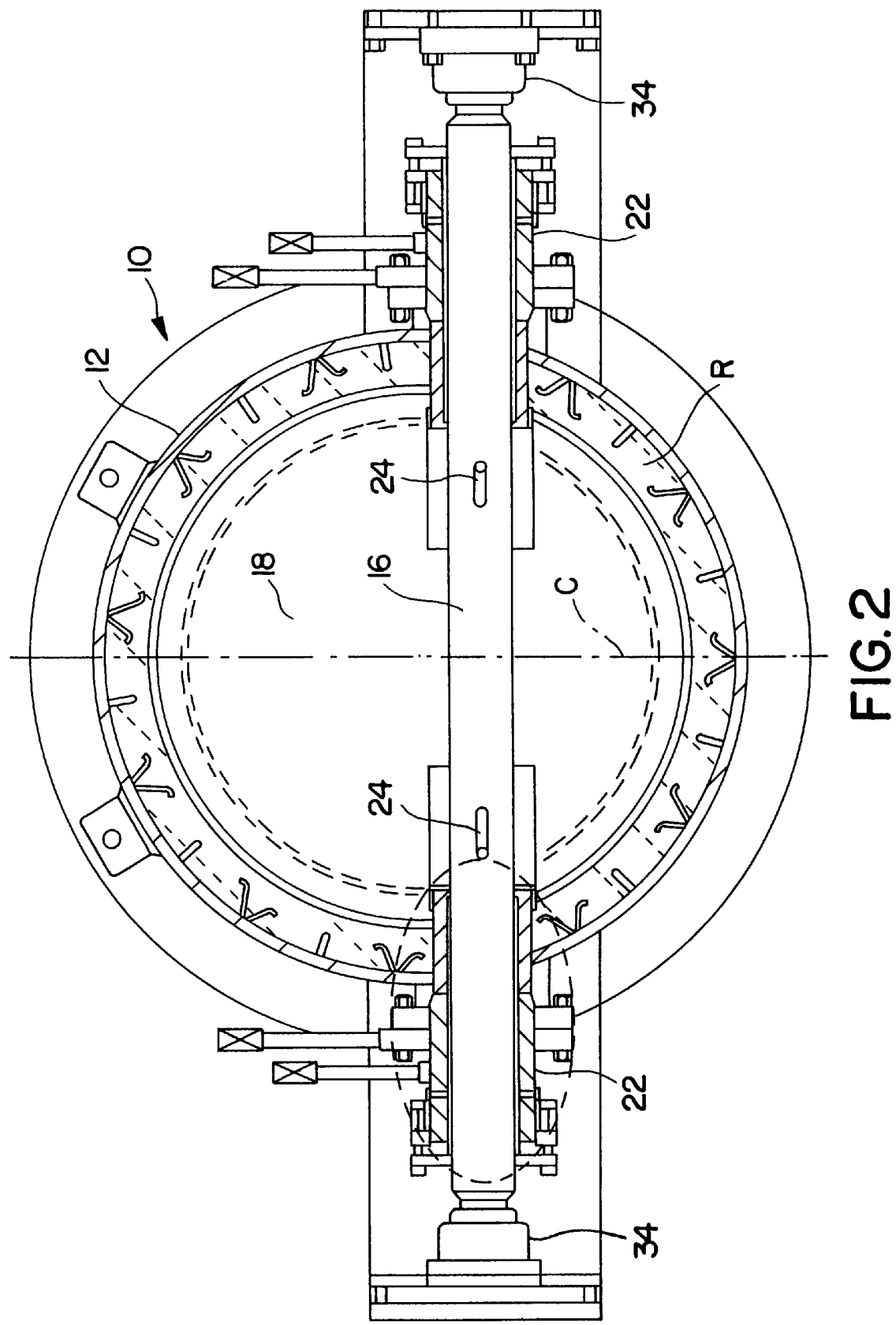
FIG. 2 is a cross-sectional view of the butterfly valve of FIG. 1.
Figure 3:
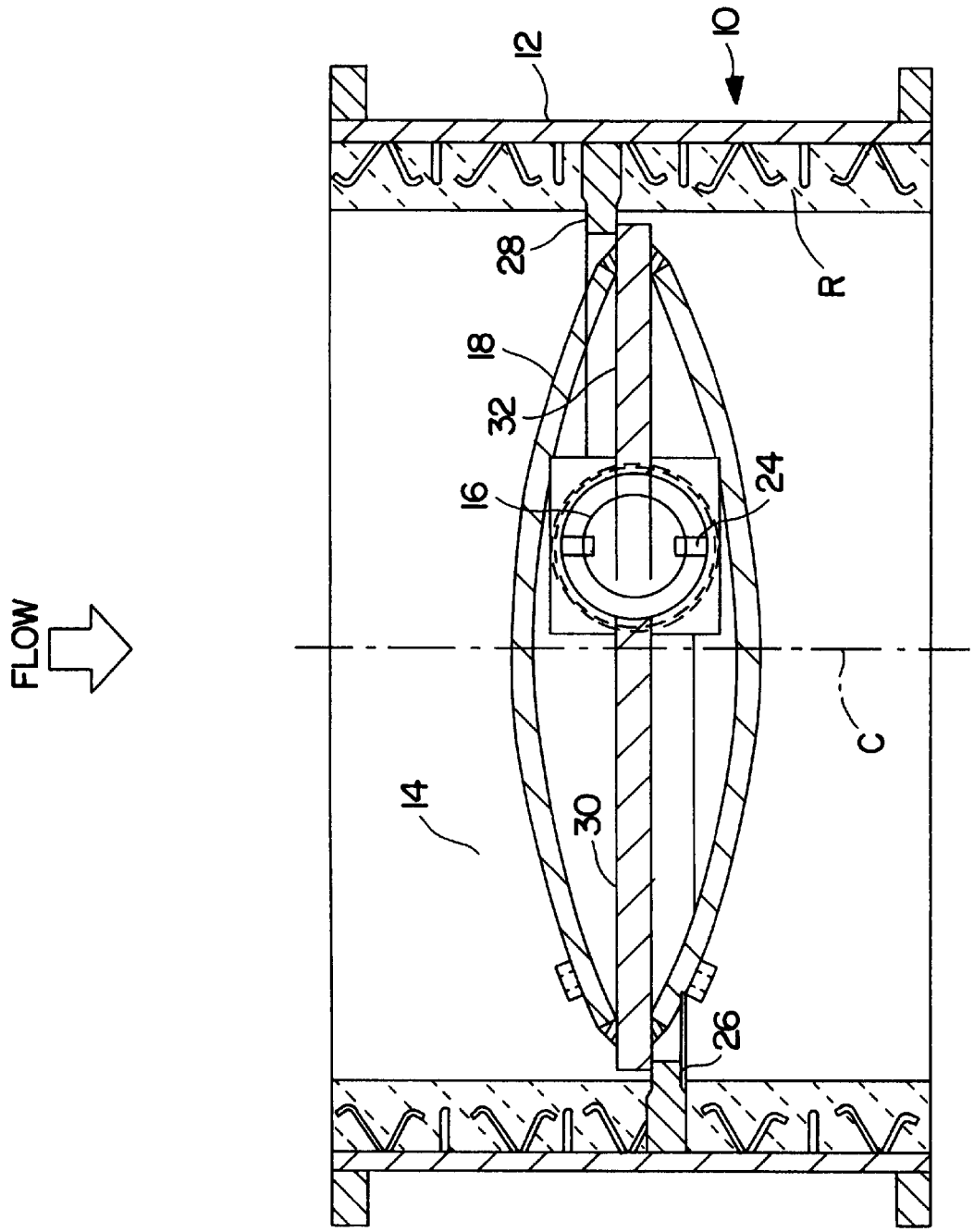
FIG. 3 is a view taken along the line 3—3 of FIG. 2.

Referring now to FIGS. 2 and 3, the off center positioning of the stem 16 is illustrated. Here the stem 16 is located off center from the center line C about 50 percent of the stem diameter. There is no theoretical maximum or minimum distance. However, from a practical matter, the distance off center of the valve stem would exceed about 25 percent of the valve diameter.

As best illustrated in FIG. 3, stop means 26 and 28 are provided, the stop means 26 engaging the downstream side of the disc 18, and the stop means 28 engaging the upstream side thereof. This results in a longer extension 30 of the valve disc 18 being supported both by the stop means 26 and the stem 16; whereas, the shorter extension 32 is not supported by the stop means 28 in the direction of flow through the flowway 14. Thus, there is less deflection of the shorter extension 32 in the off centered stem of the butterfly valve 18 than if it would be centered and have an equal extension and hence a longer unsupported extension of the disc 18 resulting in more deflection of the disc and rotation of the stem 16. Preferably, the stop means 26 and 28 are semi-circular ring-shaped to provide support for the disc 18 and provide a non-leaking or reduced leaking closure of the disc 18.

Figure 4:
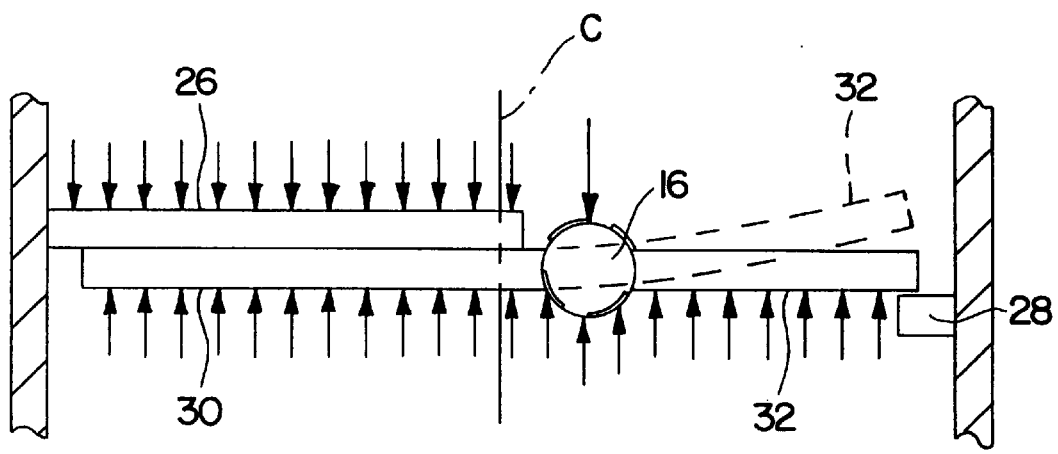
FIG. 4 is a diagrammatic view illustrating reduced deflection of the disc and rotation of the stem of an offset stem of the present invention.
Figure 5:
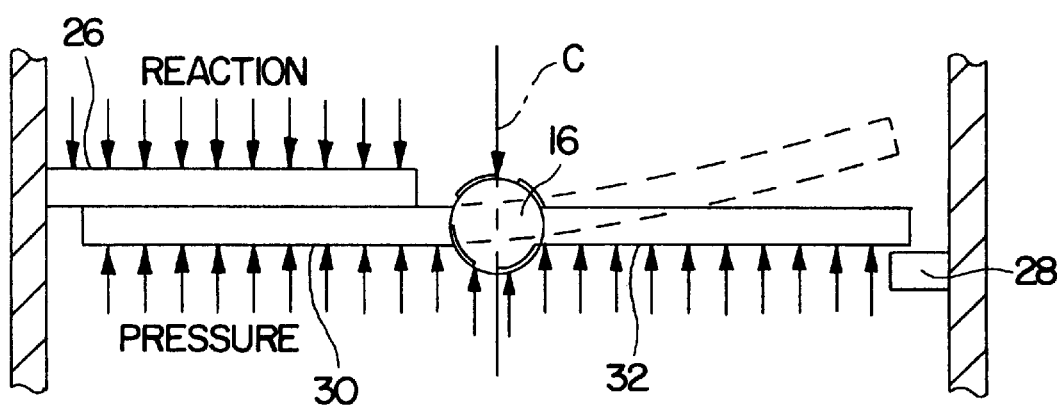
FIG. 5 is a view similar to FIG. 4 illustrating a prior art centered stem and disc deflection of the disc and rotation of the stem.

The foregoing is better illustrated in diagrammatic FIGS. 4 and 5 to which reference is now made. In FIG. 5, the deflection of the disc 18 is the same length as the extension 30, and hence there is more deflection in the unsupported side of the disc 18. In FIG. 4, however, due to the shorter length of the extension 32 of the disc 18 which is unsupported, there is less deflection of both the disc 18 and rotation of the stem 16.

Referring to FIGS. 1 and 2, the stem 16 is rotatably supported in position by the bearings generally indicated by the reference numeral 34, which may be of any desired construction, are currently being used in butterfly valves; and no detailed description thereof is deemed necessary or given.

Still with reference to FIGS. 1 and 2, a lining of refractory material R may be secured to the inner surface of the body 12. Any refractory material having sufficient strength can be used for the liner, which materials are available from a number of suppliers including Harbison Walker (Pittsburgh, Pa.), National Refractories (Oakland, Calif.), Norton Co. (Worchester, Mass.), The Carborundum Co. (Niagara Falls, N.Y.), Resco Products, Inc. (Morristown, Pa.), Plibrico (Chicago, Ill.), and A. P. Green (Mexico, Mo.).

While the butterfly valve of the present invention is well suited and adapted for use in high pressure, high velocity with or without abrasive particles, and in high temperature flow streams, it can be used advantageously for any purposes in controlling flow of fluids having pressures or velocities which would cause a deflection of the butterfly valve and rotation of the valve stem.

Accordingly, the present invention is well suited and adapted to attain the objects and ends and has the advantages and features mentioned as well as others inherent therein.

While presently preferred embodiments of the invention have been given for the purpose of disclosure, changes can be made therein which are within the spirit of the invention as defined by the scope of the appended claims.

What is claimed is:

1. In a butterfly valve controlling flow of fluid including a body having a flowway therethrough adapted to be connected as part of a flow line, a valve stem rotatably and sealably extending transversely through the body and the flowway, a disc connected to and centered on the valve stem for rotation therewith within the flowway, the body having first and second stop means to engage opposite sides of the disc in a position transverse to the flow in the flowway, the improvement comprising, the valve stem positioned off center from the flow through the flowway thereby providing a longer and a shorter extension of the disc centered on the valve stem transverse to the flowway, and the first stop means positioned to sealingly engage and seat the longer extension of the disc on the downstream side of the flow and the second stop means positioned to sealingly engage and seat the shorter extension of the stem on the upstream side of the flow when the disc is in closed position effective to reduce deflection of the disc and rotation of the valve stem thereby preventing or reducing leakage of flow past the disc when in the closed position.

2. The butterfly valve of claim 1 where,
the first and second stop means are semicircular.

3. The butterfly valve of claim 1 including,
a liner of refractory material secured to the body's inner surface thereby including the flowway.

4. The butterfly valve of claim 2 including,
a liner of refractory material secured to the body's inner surface thereby including the flowway.

5. The butterfly valve of claim 1 including,
the center line of the valve stem is offset at least 25 percent of the valve diameter.

6. The butterfly valve of claim 5 including,
a liner of refractory material secured to the body's inner surface thereby including the flowway.

7. The butterfly valve of claim 1 where,
the center line of the valve stem is offset about 50 percent of the valve diameter.

8. The butterfly valve of claim 7 including,
a liner of refractory material secured to the body's inner surface thereby including the flowway.

* * * * *